UNITED STATES PATENT OFFICE.

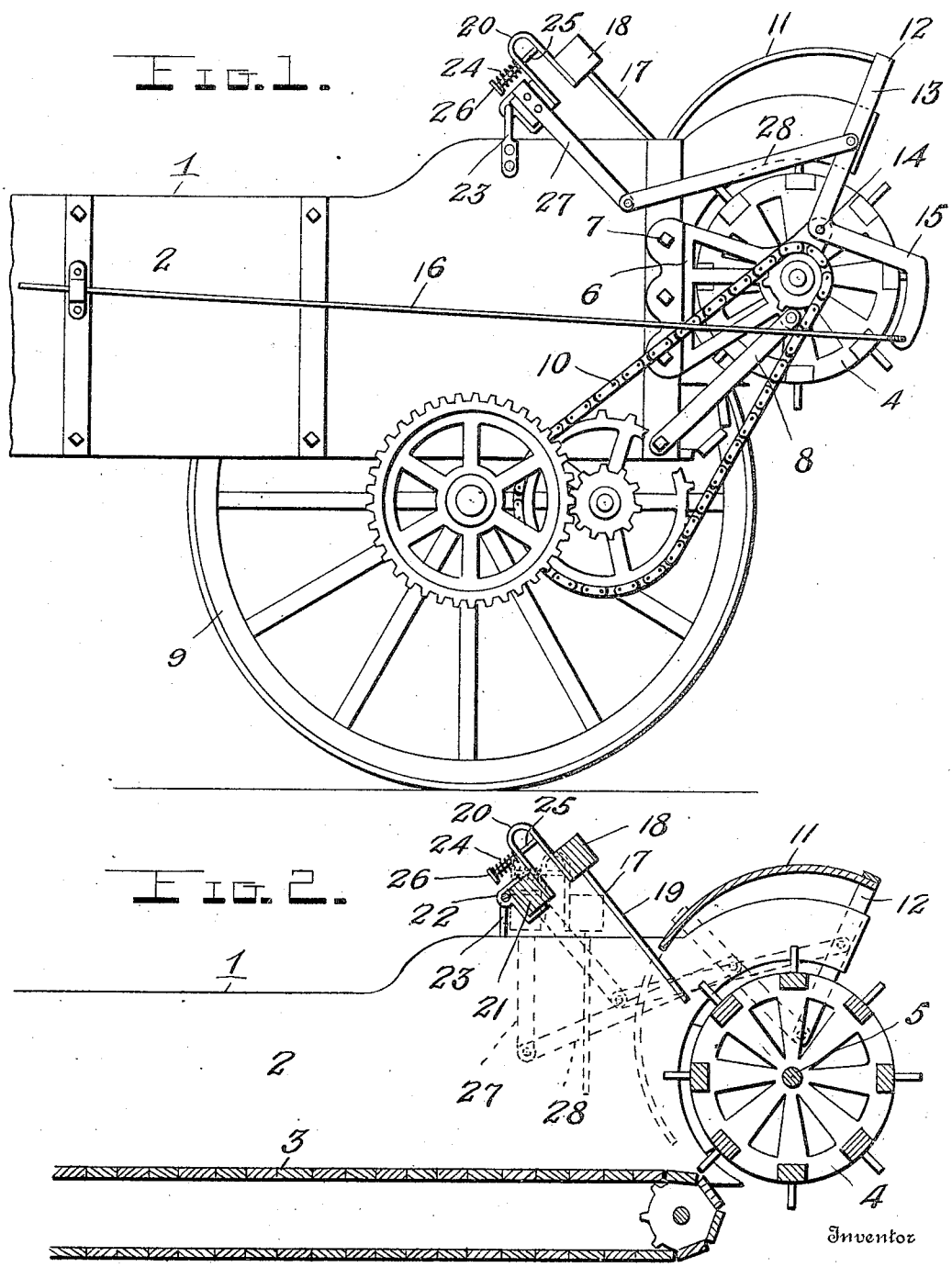

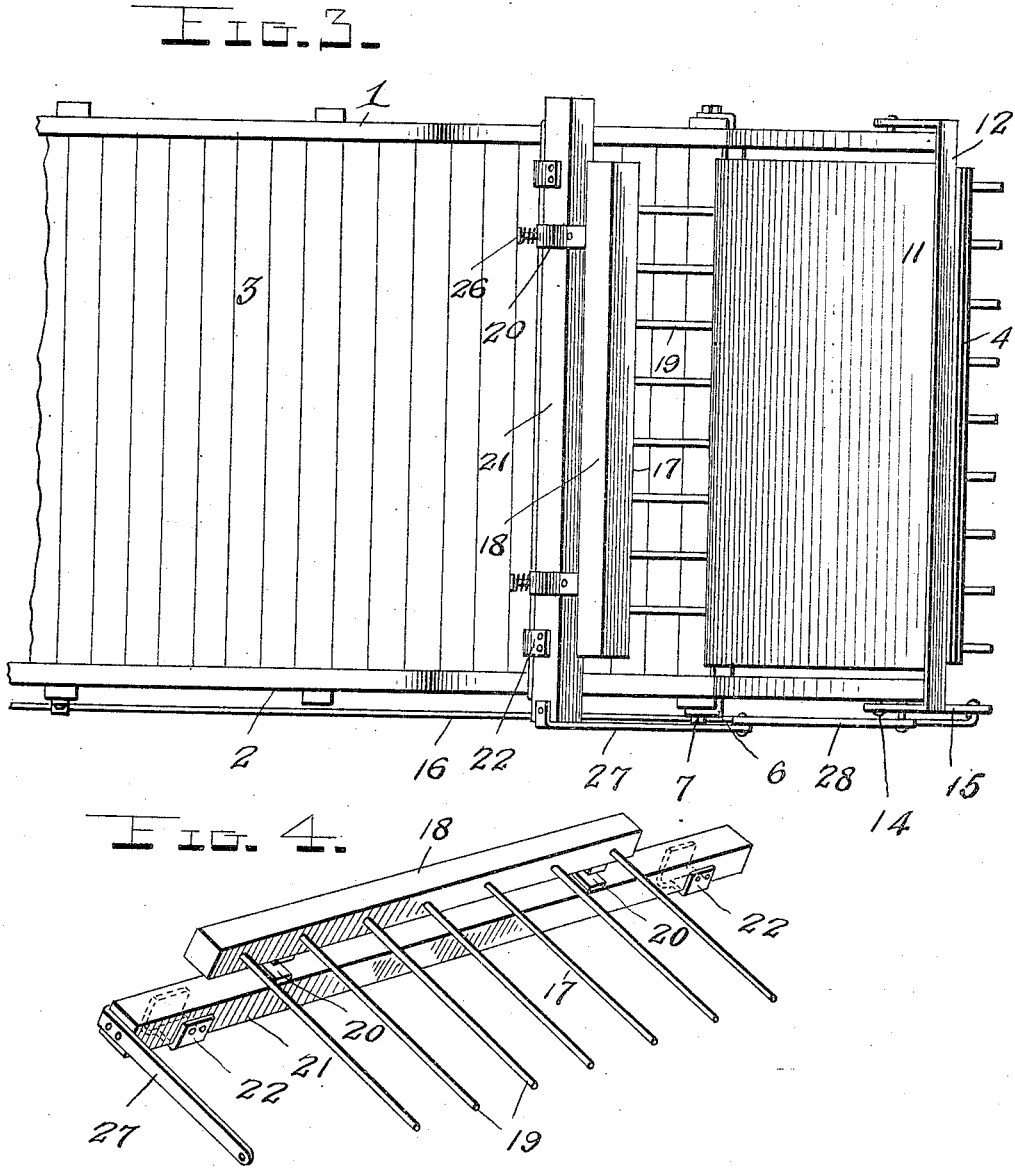

EMIL DIERKS, OF BRYANT, IOWA.

FERTILIZER-DISTRIBUTER.

943,065.

Specification of Letters Patent.  Patented Dec. 14, 1909.

Application filed February 6, 1909. Serial No. 476,537.

*To all whom it may concern:*

Be it known that I, EMIL DIERKS, a citizen of the United States, residing at Bryant, in the county of Clinton and State of Iowa, have invented certain new and useful Improvements in Fertilizer-Distributers, of which the following is a specification, reference being had to the accompanying drawings.

This invention relates to improvements in fertilizer distributers and more particularly to an improved means for regulating the feed or discharge of the manure or fertilizer from such machines.

The object of the invention is to provide a simple and practical mechanism whereby the manure will be prevented from being carried up over the top of the spreading drum or cylinder and being dropped from the machine in large unbroken masses; and a further object is to improve certain details of construction of machines of this character and thereby render the same more durable.

With the above and other objects in view, the invention consists of the novel features of construction and the combination and arrangement of parts hereinafter fully described and claimed, and illustrated in the accompanying drawings, in which—

Figure 1 is a side elevation with parts broken away, of a fertilizer distributer having the invention applied thereto; Fig. 2 is a detail vertical longitudinal section; Fig. 3 is a top plan view of the parts shown in Fig. 1, the gearing, however, being omitted; and Fig. 4 is a detail perspective of the feed regulator or rake.

In the drawings 1 denotes a portion of the body of a fertilizer distributer having side walls 2 and a bottom formed by an endless apron or belt 3. At the end of the body is arranged a toothed feeding drum or cylinder 4, the shaft 5 of which is journaled in bearings in two bracket plates 6 bolted at 7 to the ends of the side walls 2 of the body. In order to prevent said bracket plates 6 from sagging and to relieve the bolt 7 of strain, angular or inclined braces 8 are provided between the outer ends of said bracket plates and the lower rear corners of the sides 2 of the body, as clearly shown in Fig. 1 of the drawings. The shaft of the feed cylinder 4 is driven from the supporting wheels 9 of the machine by means of gearing 10, as illustrated or in any other suitable or preferred manner.

11 denotes a curved or concaved head secured at its rear edge to a cross bar 12 uniting two arms 13, which latter are pivoted at 14 to the rear ends of the bracket plates 6. One of the arms 13 is angular, the pivot 14 being arranged at its angle and its other arm 15 is connected by a forwardly extending link or rod 16 to a suitable operating lever or equivalent device at the front of the wagon body. It will be seen that when the rod 16 is moved rearwardly, the arms 13 will be thrown forwardly and the hood 11 will be thrown downwardly and forwardly from its normal elevated position over the toothed feeding cylinder 4, shown in full lines in Figs. 1 and 2, to its dotted line position shown in Fig. 2. In this lowered position it will effectively prevent the manure from passing out of the body of the machine when the latter is moved from place to place and it is not desired to drop the manure. It will also prevent the manure from passing out of the end of the body while the latter is being filled.

17 denotes the improved feed regulator which is in the form of a rake or fork consisting of a transverse bar 18 provided with tines or teeth 19. Said bar 18 is connected by U-shaped springs 20 to a second transverse bar 21, the latter being pivotally hung by means of U-shaped clips 22 from an inverted U-shaped rod 23 connecting the upper portions of the sides 2 of the body. The U-shaped springs 20 are strengthened and rendered more elastic by coil springs 24 arranged upon rods 25 and confined between heads or shoulders 26 upon the outer extremities of said bolts and one of the arms of the springs 20 through openings in which arms said plates project. The opposite ends of the bolts are fixed in the opposing arms of the springs, which latter arms have the rake head or bar 18 passed into them. The U-shaped clips 22 have their arms engaged with and fastened to the bar 21 and their intermediate portions are bent to form pivot eyes which receive the rod 23, as clearly shown in Fig. 2 of the drawings. Fixed to one end of the pivoted bar 21 is an angular metal strap which forms a crank arm 27 and which is connected by a link 28 to the arm 13 on the adjacent side of the machine. The link 28 connects the hood and feed regulator or rake for simultaneous movement and when the hood is in its elevated position, it supports the rake in the full line position shown in Figs. 1 and 2 in which the tines of said rake are disposed over the front of the toothed feed cylinder and immediately beneath the front edge of the hood 11 so that any large pieces of manure picked up by the teeth of the feed cylinder will be caught by the tines 19 and prevented from passing under the hood and over the top of the cylinder and being dropped upon the ground in an unbroken state. When the hood 11 is swung to its lowered position the link 28 will swing the feed regulator or rake downwardly to the dotted line position shown in Fig. 2 so that it will not interfere with the movement of the hood. By arranging the feed regulator or rake in advance of the feed cylinder and hanging it from the pivot rod 23 and connecting it by the link 28 and crank arm 27 to the hood for simultaneous movement therewith, it will be seen that large pieces or masses of manure will be prevented from passing over the top of the feed cylinder and dropping upon the ground without being broken up and it will therefore insure an even discharge of small pieces of manure by the coöperation of the feed cylinder and apron 3.

Having thus described the invention what is claimed is:

The herein described fertilizer distributer comprising a body having side walls, an endless apron arranged between the walls and forming a bottom for the body, a rotary toothed feed cylinder disposed transversely at the rear end of the body, a transversely curved hood for said cylinder, arms projecting from said hood and pivotally mounted, the arm at one end being angular, an operating rod connected to the last mentioned arm, an inverted U-shaped pivot rod having its horizontal portion extending across the top of the body and its depending ends secured to the side walls thereof, a transverse bar, pivot straps passed around the horizontal portion of said rod and having their ends secured to said bar, a toothed feed regulator, spring devices connecting the latter to said bar, an arm secured to, and projecting from, one end of said bar, and a link connecting the last mentioned arm to said angular arm of the hood.

In testimony whereof I hereunto affix my signature in the presence of two witnesses.

EMIL DIERKS.

Witnesses:
 HANS SCHROEDER,
 PETER HAUSEN.